US006412796B1

(12) United States Patent
Kroniger

(10) Patent No.: US 6,412,796 B1
(45) Date of Patent: Jul. 2, 2002

(54) DRAWBAR-TYPE REAR WHEEL SUSPENSION FOR MOTOR VEHICLES

(75) Inventor: Wilhelm Kroniger, Friolzheim (DE)

(73) Assignee: Micro Compact Car Smart GmbH, Renningen (DE)

( * ) Notice: Subject to any disclaimer, the term of this patent is extended or adjusted under 35 U.S.C. 154(b) by 0 days.

(21) Appl. No.: 09/639,166

(22) Filed: Aug. 16, 2000

Related U.S. Application Data

(63) Continuation-in-part of application No. PCT/EP99/01096, filed on Feb. 19, 1999.

(30) Foreign Application Priority Data

Feb. 20, 1998 (DE) .......................................... 198 07 146

(51) Int. Cl.[7] ................................................. B60G 3/08
(52) U.S. Cl. ......................... 280/124.111; 280/124.128
(58) Field of Search .................. 280/124.111, 124.106, 280/124.116, 124.128, 124.152

(56) References Cited

U.S. PATENT DOCUMENTS

| | | | | |
|---|---|---|---|---|
| 2,753,190 A | * | 7/1956 | Hooven ................. | 280/124.111 |
| 3,414,290 A | * | 12/1968 | Wilfert et al. ......... | 280/124.116 |
| 3,448,992 A | * | 6/1969 | Wilfert et al. ......... | 280/124.111 |
| 3,473,821 A | * | 10/1969 | Barenyi et al. ........ | 280/124.111 |
| 3,586,346 A | * | 6/1971 | Sautter ................. | 280/124.153 |
| 3,610,655 A | * | 10/1971 | Barenyi ................ | 280/124.116 |
| 3,709,516 A | | 1/1973 | Ewert .................. | 280/124.113 |
| 4,767,133 A | * | 8/1988 | Yamada ................ | 280/124.111 |
| 5,924,711 A | * | 7/1999 | Schote ................. | 280/124.111 |

FOREIGN PATENT DOCUMENTS

| | | |
|---|---|---|
| DE | 44 22 875 | 1/1996 |
| EP | 0 811 512 | 12/1997 |

* cited by examiner

Primary Examiner—Paul N. Dickson
Assistant Examiner—Mariano Sy
(74) Attorney, Agent, or Firm—Klaus J. Bach

(57) ABSTRACT

In a drawbar-type rear wheel suspension for a motor vehicle comprising a drawbar axle body connected to the vehicle body by a universal drawbar body joint and having wheel support arms on which vehicle wheels are supported, and struts extending laterally between the free ends of the wheel support arms and the vehicle body and being connected thereto by elastic pivot joints, the elastic pivot joints of the struts at the vehicle body are disposed at a higher level than the universal drawbar joint and also the elastic pivot joints of the struts at the wheel support arms, and further, the drawbar axle body has a uniform cross-section rover its full length and provides for an elasticity such that the deformation of the drawbar axle caused by side forces is in the same range as the sum of the deformations of the elastic pivot joints of at least one strut.

4 Claims, 2 Drawing Sheets

DRAWBAR-TYPE REAR WHEEL SUSPENSION FOR MOTOR VEHICLES

This is a continuation-in-part application of international application PCT/EP99/01096 filed Feb. 19, 1999 and claiming the priority of German application 198 07 146.9 filed Feb. 20, 1998.

BACKGROUND OF THE INVENTION

The invention relates to a drawbar-type rear wheel suspension for motor vehicles comprising a drawbar axle body which is mounted to the vehicle body by means of a universal joint and which has vehicle wheel support arms engaged at their free ends by struts which extend in a transverse plane of the vehicle. The universal joint is disposed at a lower level than the strut joints supporting the drawbar arms. Each strut is supported on the vehicle body by an elastic pivot joint, which is disposed at a higher level than the strut joints with the drawbar arms. The drawbar axle body is elastically deformable at least in a direction transverse to the vehicle.

Such a drawbar-type wheel suspension is known for example from EP 0 811 512 A1. In the area of the drawbar body pivot joint, the drawbar body is either pivotable or elastically bendable. A deformation of the drawbar about a pivot joint or a bendable area however results in a relatively large wheel displacement in the travel direction particularly during upward movement of both wheels. This wheel displacement causes undesired jerking motions particularly in lightweight compact cars.

A drawbar-type wheel suspension with struts interconnecting the trailing ends of the drawbar body is further known from DE 44 22 875 A1. In this case, the struts are two curved rods, which extend essentially in parallel relationship and are joined at their inner ends thereby forming a double-sided triangular transversal swing arm (A-arm). The double A-arm has its outer opposite ends pivotally connected to the trailing arm ends of the drawbar axle body behind the wheel center cross-sectional plane. In the center area, the struts are supported on the vehicle body in a statically defined manner by a pivot support member which is pivotable about a transverse vehicle axis. During upward and downward movement of the wheels the lever arrangement formed by the double A-arms and the pivot support member performs a scissors-like movement. Because of the many joints in the lever arrangement, there is a relatively low transverse rigidity which does not provide for firm side force support and/or does not permit good roll and/or side force control or it makes such control possible only with relatively expensive additional structures.

It is the object of the present invention to provide a rear axle for a vehicle with drawbar-type wheel suspension which has positive roll and/or side force control properties and which can be manufactured and installed easily and inexpensively and which furthermore requires only a minimum amount of struts and joints.

SUMMARY OF THE INVENTION

In a drawbar-type rear wheel suspension for a motor vehicle comprising a drawbar axle body connected to the vehicle body by a universal drawbar body joint and having wheel support arms on which vehicle wheels are supported, and struts extending laterally between the free ends of the wheel support arms and the vehicle body and being connected thereto by elastic pivot joints, the elastic pivot joints of the struts at the vehicle body are disposed at a higher level than the universal drawbar joint and also the elastic pivot joints of the struts at the wheel support arms, and further, the drawbar axle body has a uniform cross-section over its full length and provides for an elasticity such that the deformation of the drawbar axle caused by side forces is in the same range as the sum of the deformations of the elastic pivot joints of at least one strut.

The vehicle supports the trailing arm axle body by way of maximally three joints. It is possible that the struts are connected to a joint pin, which is mounted to the vehicle body whereby the trailing arm axle body is connected to the vehicle body only by way of two joints.

The number of joints for the trailing arm wheel suspension altogether, however, is limited to five; the four joints at the ends of the struts and the trailing arm axle body joint. The four strut joints may be, dependent on the wheel suspension design, pivot or ball joints, notwithstanding their elastic liners. The smaller number of joints provides for a stiff suspension structure.

The trailing arm axle body, which may have an open or closed cross-section, is designed to be elastic. On one hand, the elastic deformability has the advantage that, upon upward movement of the wheels, the trailing arm axle body accommodates the change of the wheelbase caused by the pivot movement of the struts. On the other hand, the wall thickness of the axle body may be small in comparison with the usual De-Dion axle without any detrimental effects on the side force support capability. This is because the struts connected to the center area of the wheels transmit the side forces, which are effective when the vehicle negotiates a curve, directly to the vehicle body.

The invention will be described below in greater detail with reference to a particular embodiment of the invention which is schematically represented in the accompanying drawings.

DESCRIPTION OF A PREFERRED EMBODIMENT

Figure 1:
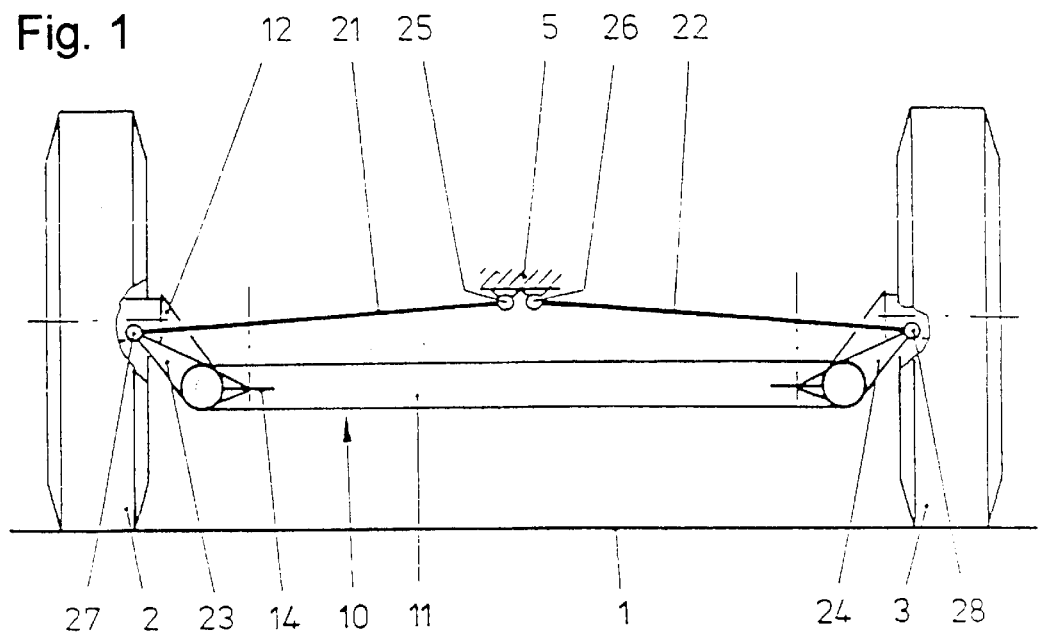
FIG. 1 is a rear view of the trailing arm type wheel suspension according to the invention.
Figure 2:
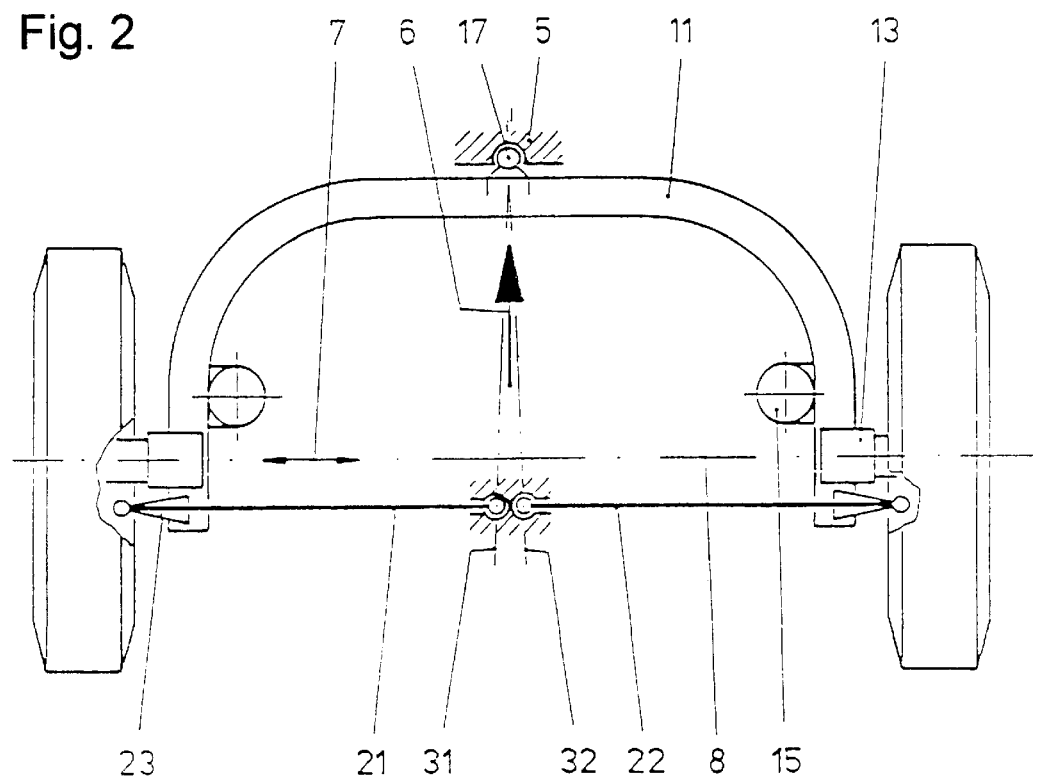
FIG. 2 is a top view of the trailing arm type wheel suspension.
Figure 3:
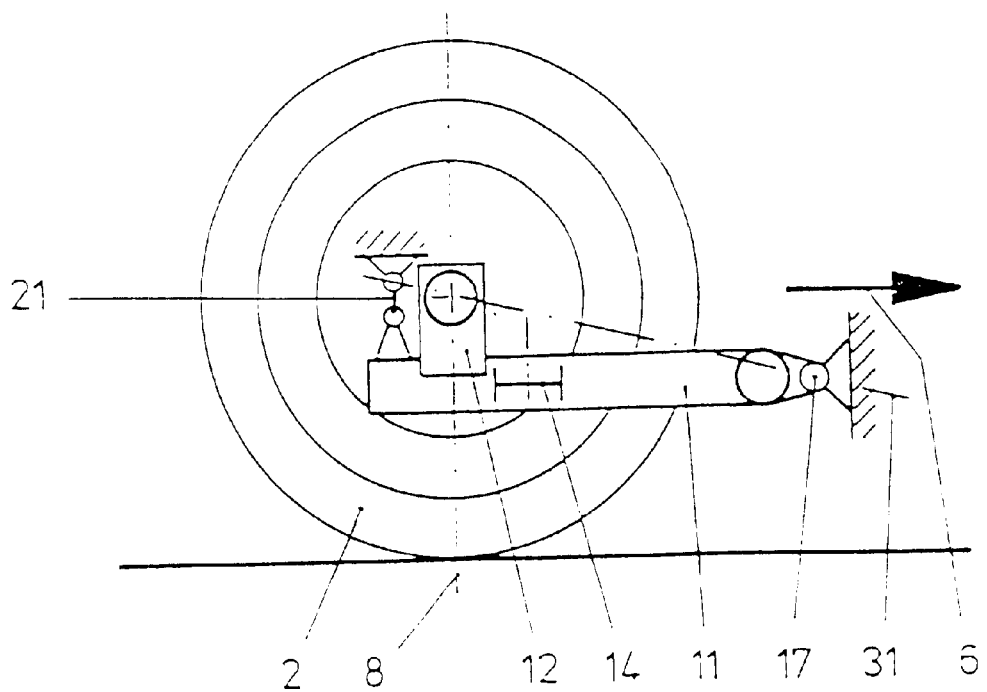
FIG. 3 is a side view of trailing arm type wheel suspension.

FIGS. 1–3 show a trailing arm type axle structure for a rear wheel suspension of a motor vehicle whose rear wheels may be employed as drive wheels. The trailing arm type axle structure includes a curved trailing arm axle body 10 at each of whose opposite ends a wheel 2, 3 is supported. The trailing arm axle body 10 is pivotally supported on the vehicle body 5 essentially in the center of the vehicle—as seen in the longitudinal vehicle direction. In addition, a strut 21, 22 is connected to each end of the trailing arm axle body 10 behind the wheel center transverse plane 8. In the embodiment shown, the struts 21, 22 are linked to the vehicle body also about in the center of the vehicle.

The trailing arm axle body 10 as shown in the drawings is a U-like bent elastic axle tube 11, which has a uniform cross-section over its full length. Preferably, the tubular axle tube 11 has a circular cross-section. The axle tube 11 extends for example essentially parallel to the road surface 1 below the centerline of the rear wheels. In the area of the wheels, the trailing arms extend essentially parallel to the wheels whereas the center section of the axle body 10 extends transverse to the longitudinal vehicle axis. At its center, the axle tube 11 includes an axle joint 17 through which all longitudinal forces are transferred to, and from the vehicle body. The axle joint 17 is preferably a universal joint, by way of which the axle tube 11 is cardanically supported on the vehicle body 5. The axle joint 17 is arranged relatively low, so that the diving of the front end of the vehicle during braking and its uplifting during acceleration are minimized.

At the ends of the trailing arms, the axle tube is provided with upwardly extending outwardly inclined wheel carrier members 12, 13, which preferably extend outwardly into the inner wheel cavities as indicated in FIGS. 1 and 2. In front of the wheel carrier members 12, 13, the trailing arms are provided with support brackets 14, 15, which extend inwardly toward each other for mounting the spring and shock absorber elements, which are not shown. Behind the wheel carrier members 12, 13, the trailing arms are provided with mounting arms 23, 24. The mounting arms 23, 24 project from the trailing arms upwardly and outwardly.

At their free ends, the mounting arms 23, 24 support pivot joints 27, 28, whose centers are disposed at a level slightly below the wheel axis centerline. The centers of the pivot joints 27, 28 are also disposed behind the vertical plane 8 extending through the wheel axis.

The struts 21, 22, which are disposed for example in a transverse plane of the vehicle are slightly inclined toward the center of the vehicle when the vehicle is in a neutral orientation. The pivot joints 25, 26 of the struts 21, 22 are therefore arranged at a higher level than the joints 27, 28 at the wheel ends of the struts 21, 22. The struts 21, 22, which are normally supported in elastic rubber joints, take up a large part of the side forces effective on the wheels and transmit them to the vehicle body 5.

FIG. 1 shows the inclined arrangement of the struts 21, 22, which provides for in over-defined support of the rear axle that results in pressure forces in the struts 21, 22 and in bending and torsion forces in the axle tube 11 when the wheels move upwardly against the forces of the vehicle support springs. In this process, on one hand, the rubber-elastic pivot joint structures of, the joints 25–28 are compressed at one side and, on the other hand, the axle tube 11 is bent outwardly-depending on the elasticity of the selected components—that is the distance between the free ends of the trailing arms is increased. Since the axle tube 11 has a torsion-resistant profile, the torsion movement and a corresponding change in the wheel camber is negligible.

During alternate upward movement of the wheels, that is for example in a curve, the strut leading to the outer wheel is subjected to compression forces whereas the strut leading to the inner wheel is subjected to tension. The inside curve wheel is drawn in the direction toward the vehicle centerline.

Since, under this condition, the wheels pivot about the imaginary axes 31 and, respectively 32, the outer wheel moves forward by approximately the same amount by which the inner wheel moves backward. With the coupling of the wheels 2, 3 by way of the axle tube 11, the wheel shaft moves slightly to an angular position which is slightly off the normal zero angle position in such a way that the vehicle has slight understeering characteristics.

Independently from this, a side force acting on the outer wheel may cause a comparable change of the wheel angle. If for example the transverse support for the axle joint 17 is softer than the pivot joints of the struts 21, 22, the axle joint 17 yields to a greater degree than the strut, which is subjected to compression forces when a side force occurs. This case also provides for understeer characteristics of the vehicle. Then the struts 21, 22 are displaced rearwardly in the travel direction 6 of the vehicle by at least the wheel movement distance caused by the side force.

In order to minimize the bending forces effective on the axle tube during upward and downward movement of the wheels, the struts 21, 22 should be as long as possible. If sufficient space is available they can extend up to the opposite wheel. In this case, however the struts would cross each other. They could therefore be arranged slightly inclined with respect to the vehicle transverse direction, one toward the front and the other toward the rear so that interference between the struts is avoided.

What is claimed is:

1. A drawbar-type rear wheel suspension for a motor vehicle with a vehicle body, comprising: a drawbar axle body connected to said vehicle body by means of a universal drawbar joint and having wheel support arms with free ends on which vehicle wheels are supported, struts extending laterally between the free ends of said wheel support arms and said vehicle body and having elastic pivot joints at their opposite ends, one connected to said wheel support arms and the other to said vehicle body to provide lateral support to said drawbar axle body, said elastic pivot joints at said wheel support arms being disposed at a higher level than said universal drawbar joint, and said elastic pivot joints at the vehicle body being arranged at a higher level than the elastic pivot joints at said wheel support arms, said drawbar axle body having a cross-section which is the same over the full length thereof and providing for a given elasticity, and the elasticity of said pivot Joints being so selected that the deformation of the drawbar axle body is in the same range as the elasticity of the pivot joints of at least one strut when side forces are effective on said drawbar axle body.

2. A drawbar-type rear wheel suspension according to claim 1, wherein the elasticity of said drawbar axle body in the transverse vehicle direction is at least twice the elasticity of the pivot joints of said struts.

3. A drawbar-type rear wheel suspension according to claim 1, wherein said drawbar axle body is tubular and has a circular cross-section.

4. A drawbar-type rear wheel suspension according to claim 1, wherein said struts are connected to mounting arms extending from said wheel support arms outwardly adjacent the wheels which include wheel rims supported by said wheel support arms and the elastic pivot joints of said struts are disposed at the outer, edges of said mounting arms adjacent said wheel rims.

\* \* \* \* \*